July 31, 1934.  V. G. APPLE  1,968,584
BRAKE MECHANISM
Original Filed Nov. 2, 1929  3 Sheets-Sheet 1

INVENTOR.
Vincent G. Apple
BY
Burton & McConkey
ATTORNEYS

July 31, 1934.  V. G. APPLE  1,968,584
BRAKE MECHANISM
Original Filed Nov. 2, 1929  3 Sheets-Sheet 2

INVENTOR.
Vincent G. Apple
BY Burton & McConkey
ATTORNEYS

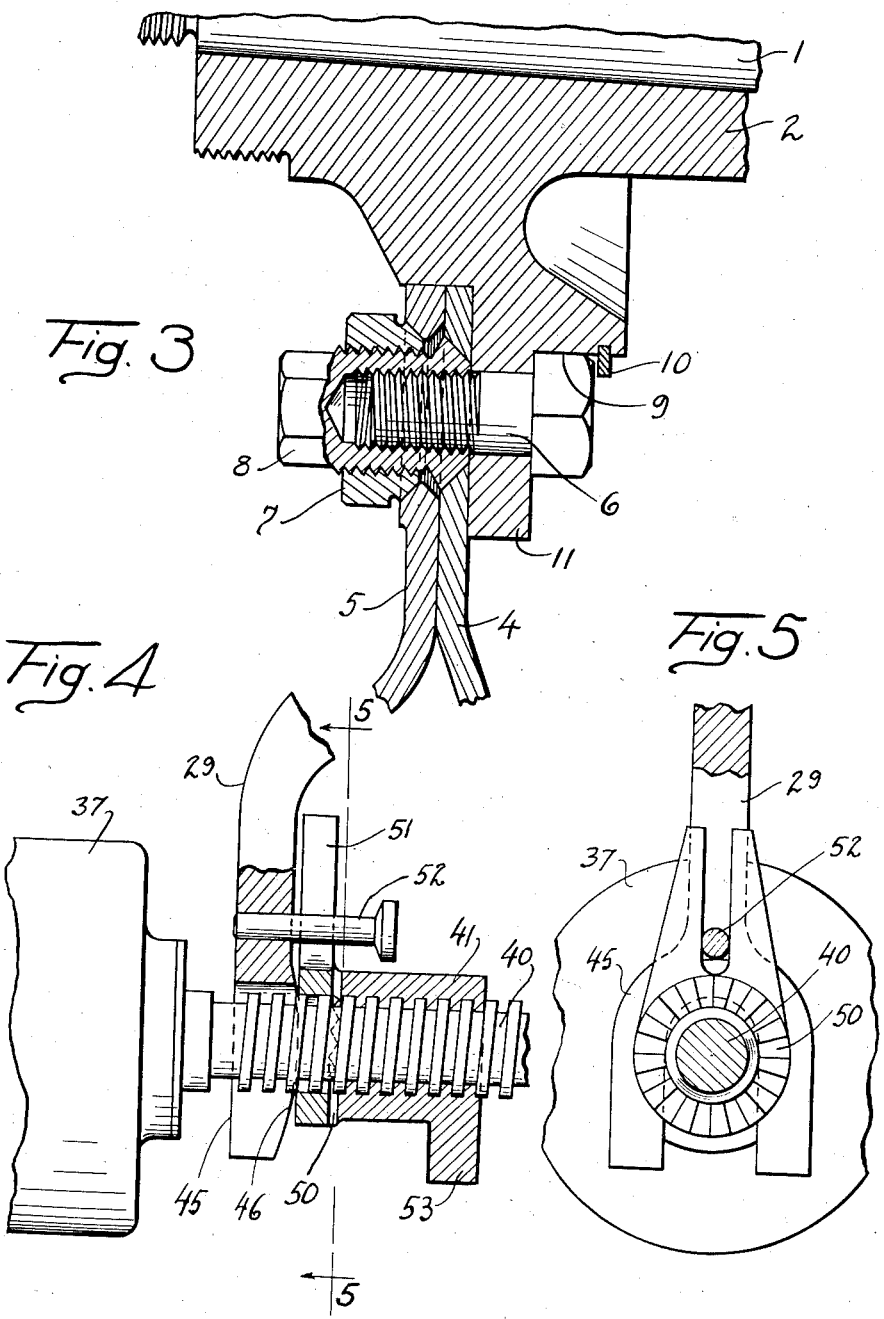

Patented July 31, 1934

1,968,584

UNITED STATES PATENT OFFICE 1,968,584

BRAKE MECHANISM

Vincent G. Apple, Dayton, Ohio, assignor to Bendix Brake Company, South Bend, Ind., a corporation of Illinois Application November 2, 1929, Serial No. 404,232
Renewed July 15, 1933

6 Claims. (Cl. 188—162)

My invention relates to improvements in brakes, particularly automotive vehicle brakes wherein power mechanism and manually operable mechanism cooperate in such a manner that the brakes may be applied by either independently of the other.

The brake mechanism and the associated operating mechanism, including the power device for each brake, is located within a completely enclosed brake drum and the power device includes a reversibly rotatably driven shaft coupled with the brake friction means to apply the same upon rotation thereof in one direction, to hold the same applied following application thereof upon discontinuance of rotation of the shaft, and to permit release of the brake friction means by a reversal of rotation of the shaft.

A meritorious feature lies in an improved type of coupling between the shaft and the brake structure to positively hold the brake applied following its power application and until the same is released by reversal of rotation of the power shaft. The brake structure and the power operating mechanism are similar to that shown in my copending application, Ser. No. 407,084, filed November 14, 1929, except that in this application an improved coupling is arranged between the power means and the brake friction means and the present construction is shown applied to a semi-floating axle and an improved connection is shown as securing the brake drum and wheel disk to the hub.

This improved coupling insures positive retention of the brake in the applied position following its power application and until the same has been released thereby. The improved securing means which connects the brake drum and the wheel disks and the hub together maintains a tight connection at all times between said parts. The entire assembly, including the manual operating mechanism, is adapted for a semi-floating action.

Other objects, advantages and meritorious features will more fully appear from the following description, appended claims and accompanying drawings, wherein:

Fig. 3 is an enlarged detail sectional view of the double nut assembly.

Fig. 4 is a detail view of a modification of the screw and nut brake applying means shown in Figs. 1 and 2.

Fig. 5 is a section taken on the line 5—5 of Fig. 4.

Figure 1:
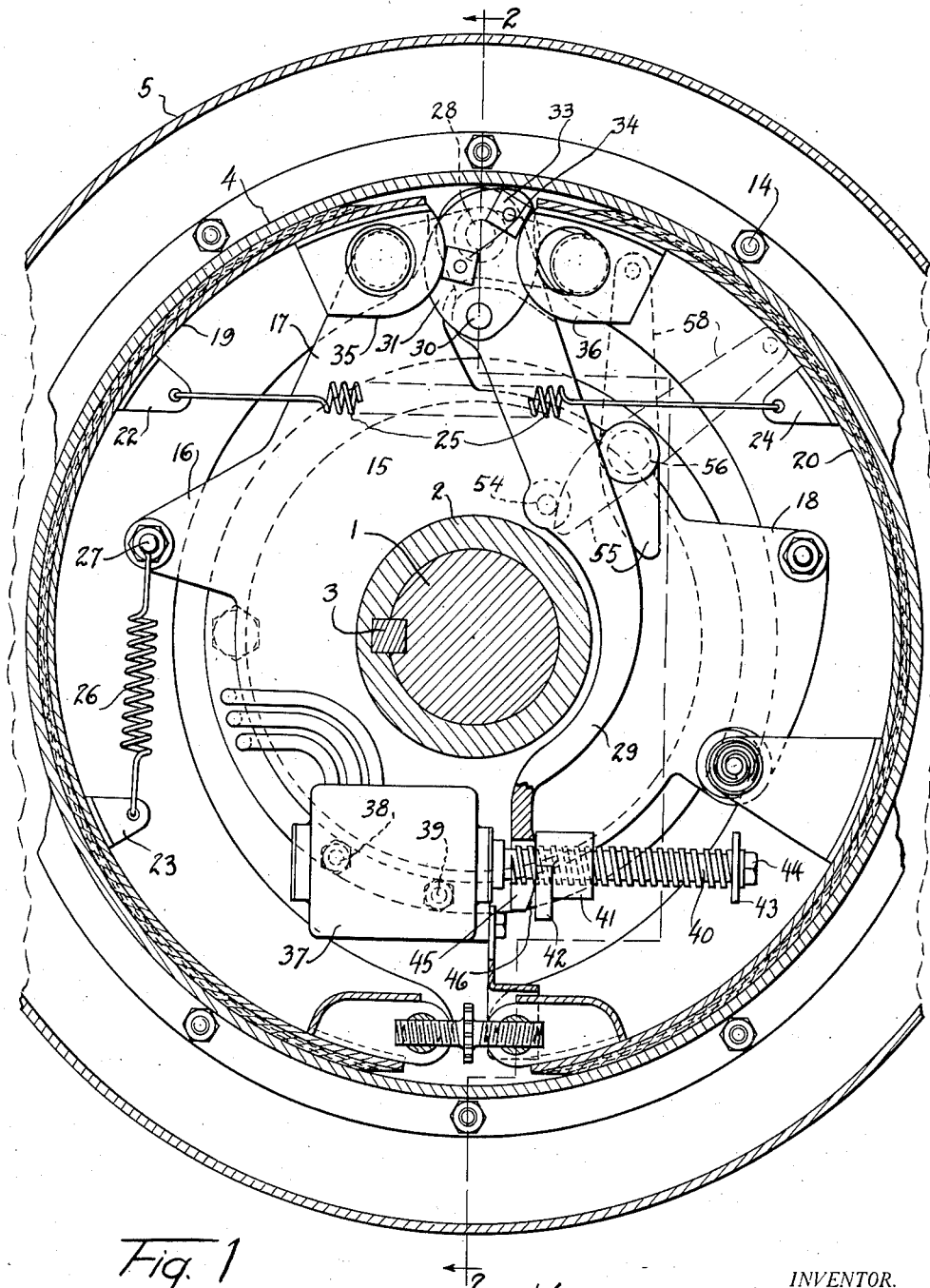
Fig. 1 is a sectional view of my brake assembly mounted on a semi-floating rear axle, shown with brakes applied.

The wheel hub 2 is keyed to the tapered portion of the automotive axle shaft 1 by means of the key 3, and the brake drum 4 and the wheel 5 are mounted on this hub and held thereto by the bolt 6 and the nuts 7 and 8. The bolt 6 is prevented from turning by having its flat head portion resting against the cylindrical part 9 of the hub 2. A snap ring 10 functions to prevent the bolt from falling out of its aperture.

The hub member 2 is provided with a flange 11 and the nut 8 fastens the drum 4 to the flange 11, while the nut 7 retains the wheel member 5 to the hub 2 and is screwed on to the outer portion of the nut 8. In this double nut and bolt assembly for holding tight the drum, hub and wheel members there is a tendency to further tighten the nut 7 by virtue of the rotation of the wheel. This tendency in turn functions to keep the nut 8 tight. The live axle 1 is journaled in the housing 12 by means of bearings within the housing, and is bolted and centered to the axle housing 2'. A cover plate 13 is bolted to the inner open face of the drum 4 as at 14, thus providing a completely enclosed rotating brake drum secured to the wheel.

Held against rotation within the brake drum is a member 15 having the arms 16, 17, 18 to which are secured the radially expansible brake shoes 19 and 20. Attached to the inner periphery of brake shoe 19 are the flanges 22 and 23, while attached to the inner periphery of brake shoe 20 is the flange 24. A spring 25 connects the flanges 22 and 24, tending to draw the shoes radially inwardly into their inoperative position. A similar spring 26 is secured to a stud 27 on the arm 16 and fastens at its other end to the flange 23.

The arm 17 carries the stud 28 on which is fulcrumed the brake actuating arm 29. Pivoted to the brake arm 29 by stud 30 are the camming plates 31 and 32 and to these plates are rotatably pivoted the blocks 33 and 34. On movement of the arm 29 the blocks 33 and 34 engage the flanges 35 and 36 which are welded to the inner periphery of the brake shoes and function to expand them against the inner surface of the drum. An electric motor 37 is mounted on the housing 12 by the bolts 38 and 39 and the electric cables for transmitting current to the motor are carried outside the enclosed drum 4 through conduits leading through the housing 12.

This electric motor is of the series wound type and is reversible. On an extension of its armature shaft 40 there is a screw thread. On this thread portion of the armature is mounted a correspondingly threaded runner 41, which is provided with a depending weighted portion 42, the inertia of which prevents the nut from turning when the motor is running. As a result thereof, rotation of the armature shaft 40 causes the runner 41 to slide axially along the shaft. Its direction of axial movement depends, of course, upon the direction of rotation of shaft 40.

The end of the armature shaft is provided with a plate 43 retained on said shaft by the cap screw 44, the thread of which is of opposite hand to the thread on the shaft itself. This plate 43 functions to prevent the runner 41 sliding off the shaft 40. The brake arm 29 is bifurcated as at 45, on the end opposite the pivot point 28 and the prongs of this bifurcation straddle the armature shaft 40 thereby permitting the arm 29 to slide along this shaft. This bifurcated portion of the brake arm 29 is also provided with a rounded portion 46 which bears against the face of the runner 41.

Figure 2:
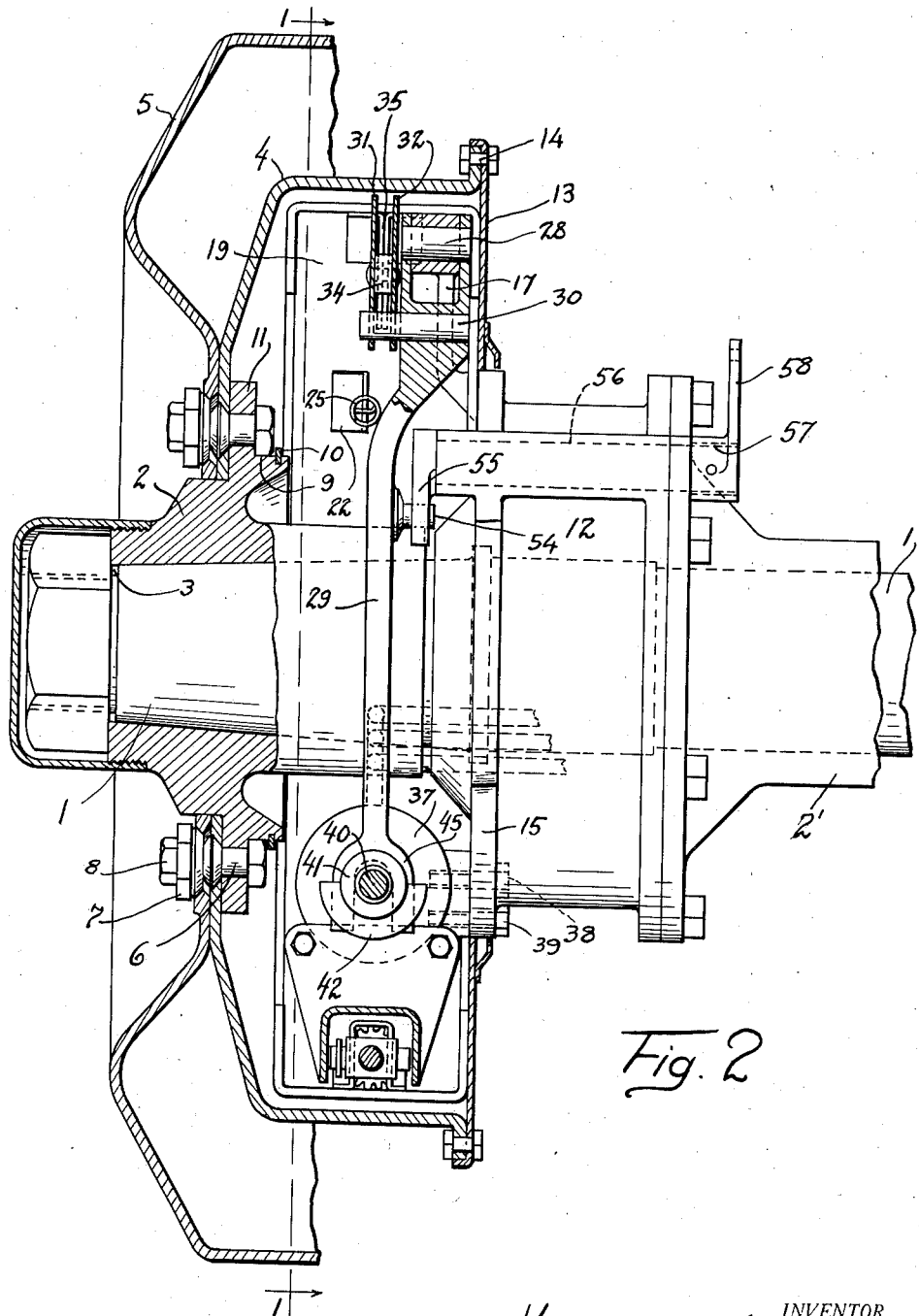
Fig. 2 is a fragmentary sectional view on the line 2—2 of Fig. 1.

When current is applied to the motor the runner 41 bears against the arm 29 and applies the brakes by means of its axial sliding movement along the armature shaft 40. The brakes, as illustrated in Figures 1 and 2, are in their "on" position. The thread on the armature shaft is of relatively low pitch and in this way the brake shoes are retained in whatever position they may be when the current through the motor 37 is shut off.

To release the brakes the motor is reversed and the runner slides away from the arm 29, thereby permitting the said arm to follow it through the action of the spring 25 acting through the camming mechanism at the opposite end of arm 29.

A somewhat modified form of "runner" mechanism is shown in Figures 4 and 5 wherein the nut is provided with serrations 50 adapted to mesh with serrations on the part 51. The part 51 is centered on the shaft 40 and is prevented from turning by the pin 52 which is held in the arm 29. The serrations 50 add somewhat to the inertia effect of the weight 53 corresponding to the weight 42 in Figure 1, and insures a positive movement of the nut along the shaft which congealed grease might otherwise prevent in cold weather.

In my design I have also provided for outside manual operation of the brakes in case of an emergency. To permit this manual operation from outside the brake drum, I provide a pin 54, mounted on the brake arm 29, and a camming lever 55 integral with the shaft 56 which is journaled in the housing 12 and splined at 57 to mesh with the operating lever 58.

Having illustrated and described the particular embodiment of my device, various modifications and changes will be apparent to those skilled in the art and for this reason I intend to limit myself only within the scope of the appended claims.

I claim:

1. In combination with a completely enclosed internal expanding brake mechanism, an electric motor having an armature shaft with a threaded extension, a brake shoe actuating arm having a bifurcated end portion straddling said shaft extension, a serrated member centered about said shaft adjacent the bifurcated portion and secured against rotation with relation thereto, and a threaded runner on said shaft having a serrated face contacting with the first mentioned serrated member.

2. Vehicle brake mechanism comprising a rotatable drum, retarding means arranged within the drum, operating mechanism coupled with the retarding means including a reversibly rotatable shaft, a part coupled with the shaft to be advanced thereover during its rotation, a second part detachably but non-rotatably coupled with said first part to be actuated thereby and coupled with the retarding means to urge the same against the drum upon rotation of the shaft in one direction.

3. Vehicle brake mechanism comprising a rotatable drum, retarding means arranged within the drum, operating mechanism coupled with the retarding means including a reversibly rotatable shaft, a part coupled with the shaft to be advanced thereover during its rotation, a second part coupled with the first part to prevent the rotation thereof and disconnectedly coupled with the retarding means to urge it into braking engagement with the drum.

4. Vehicle brake mechanism comprising a rotatable drum, retarding means arranged within the drum, operating mechanism coupled with the retarding means including a reversibly rotatable shaft, a pair of disconnectedly engaged parts one of which is coupled with the shaft to be advanced thereover during its rotation and the other of which is coupled with the retarding means and non-rotatably coupled with the first part to be actuated thereby lengthwise of the shaft to urge the retarding means into engagement with the drum.

5. Vehicle brake mechanism comprising a rotatable drum, retarding means arranged within the drum, operating mechanism coupled with the retarding means including a reversibly rotatable shaft, an operating member coupled with the retarding means, a part coupled with the shaft to be advanced thereover upon its rotation, a second part mounted on the shaft between said first mentioned part and the operating member disconnectedly engaging said first mentioned part to prevent rotation thereof and to transmit thrust therefrom to the operating member to actuate the same and to urge the retarding means into braking engagement with the drum.

6. Vehicle brake mechanism comprising, in combination, a rotatable drum, retarding means arranged within the drum, operating mechanism coupled with the retarding means enclosing an electric motor having a reversibly rotatably driven threaded shaft, a weighted runner threaded on the shaft to be advanced thereover during its rotation, said operating mechanism also including a lever arm coupled with the retarding means and provided with a portion adapted to take the thrust of the runner to be actuated thereby to urge the retarding means into braking engagement with the drum, said portion releasably coupled with the runner to resist its rotation.

VINCENT G. APPLE.